US012693931B2

(12) United States Patent
Sripada et al.

(10) Patent No.: US 12,693,931 B2
(45) Date of Patent: Jul. 28, 2026

(54) MONITORING FOR INTERCEPTION OF IMAGE DISPLAY PIPELINE AND INDICATING TO USER

(71) Applicant: QUALCOMM Incorporated, San Diego, CA (US)

(72) Inventors: Balamukund Sripada, Hyderabad (IN); Naga Chandan Babu Gudivada, Hyderabad (IN); Venkata Nagarjuna Sravan Kumar Deepala, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 526 days.

(21) Appl. No.: 17/362,798

(22) Filed: Jun. 29, 2021

(65) Prior Publication Data

US 2022/0413957 A1     Dec. 29, 2022

(51) Int. Cl.
*G06F 11/10* (2006.01)
*G06F 9/451* (2018.01)
(Continued)

(52) U.S. Cl.
CPC .......... *G06F 11/1004* (2013.01); *G06F 9/451* (2018.02); *G06F 11/1024* (2013.01); *G06F 21/57* (2013.01); *G06T 1/20* (2013.01)

(58) Field of Classification Search
CPC .......... G06F 21/57; G06F 21/50; G06F 21/51; G06F 21/572; G06F 21/577; G06F 21/565; G06F 11/1004; G06F 11/1024; G06F 11/14; G06F 11/16; G06F 11/08; G06F 9/451; G06F 9/44; G06F 21/83; G06F 21/84; G06T 1/20
See application file for complete search history.

(56) References Cited

U.S. PATENT DOCUMENTS

2005/0210035 A1    9/2005  Kester et al.
2008/0120191 A1*   5/2008  Long ...................... G06Q 20/20
                                                   705/18
(Continued)

FOREIGN PATENT DOCUMENTS

CN        111919453 A     11/2020
EP         3327605 A1      5/2018

OTHER PUBLICATIONS

International Search Report and Written Opinion—PCT/US2022/035170—ISA/EPO—Oct. 7, 2022.

*Primary Examiner* — J. Brant Murphy
*Assistant Examiner* — Sayeda Salma Nahar
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for monitoring interception of an image display pipeline and indicating a determined interception to a user. A display processor may detect that at least one application is activated based on one or more CRC values that correspond to the at least one application. The display processor may generate a UI indication for the at least one application based on detecting that the at least one application is activated and transmit, based on generating the UI indication, at least one UI layer. The at least one UI layer may correspond to the UI indication for the at least one application.

26 Claims, 6 Drawing Sheets

(51) Int. Cl.
    G06F 21/57         (2013.01)
    G06T 1/20          (2006.01)

(56)                   References Cited

U.S. PATENT DOCUMENTS

| | | | |
|---|---|---|---|
| 2015/0052616 A1* | 2/2015 | Hutchison | G06F 3/0632 |
| | | | 726/27 |
| 2016/0149957 A1* | 5/2016 | Kester | G06F 21/57 |
| | | | 726/1 |
| 2018/0196937 A1* | 7/2018 | Kwag | G06F 21/52 |
| 2018/0343238 A1* | 11/2018 | Tola | H04L 63/0421 |
| 2020/0349292 A1* | 11/2020 | Landman | G06F 21/64 |
| 2020/0402036 A1* | 12/2020 | Doka | G06Q 20/10 |
| 2022/0141242 A1* | 5/2022 | Shaya | H04L 43/12 |
| | | | 726/23 |
| 2022/0181012 A1* | 6/2022 | Skelton | G16H 40/63 |

* cited by examiner

100

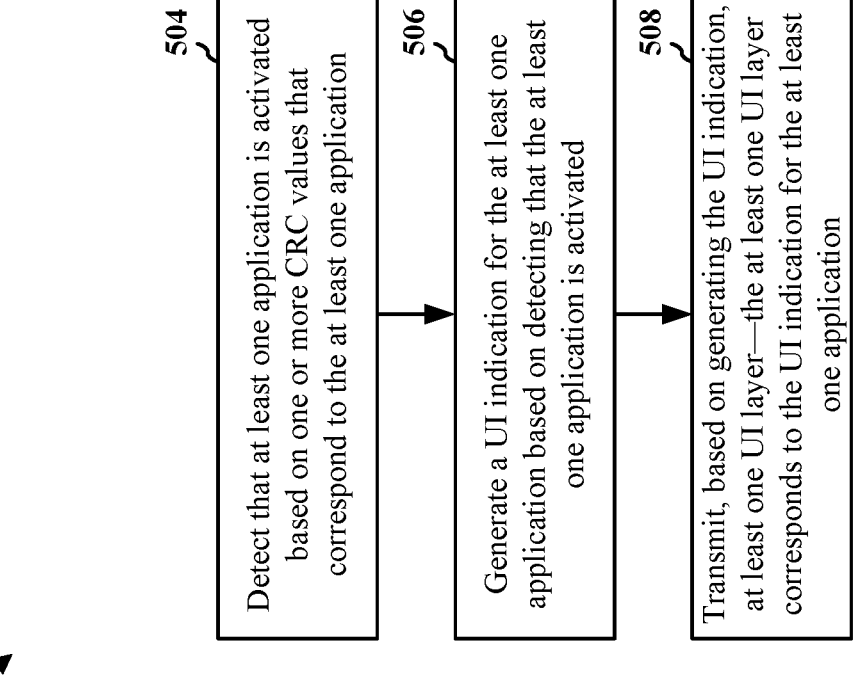

504

Detect that at least one application is activated based on one or more CRC values that correspond to the at least one application

506

Generate a UI indication for the at least one application based on detecting that the at least one application is activated

508

Transmit, based on generating the UI indication, at least one UI layer—the at least one UI layer corresponds to the UI indication for the at least one application

FIG. 6

612 — Generate a UI indication for the at least one application based on detecting that the at least one application is activated 614 — Determine and transmit a CRC of a buffer for the UI indication for the at least one application 616 — Transmit, based on generating the UI indication, at least one UI layer—the at least one UI layer corresponds to the UI indication for the at least one application 618 — Determine, based on transmitting the at least one UI layer, whether the one or more CRC values correspond to a CRC buffer 620 — Mitigate the at least one application when the CRC values do not correspond to the CRC of the buffer 602 — Configure, in a secure mode or a protected mode, one or more CRC registers that store one or more CRC values 604 — Store the one or more CRC values in a secure memory or a secure buffer after configuring the one or more CRC registers in the secure mode or the protected mode 606 — Determine whether the one or more CRC values correspond to at least one application on a device 608 — Disable the at least one application when the one or more CRC values do not correspond to the at least one application 610 — Detect that at the least one application is activated based on the one or more CRC values that correspond to the at least one application

600

MONITORING FOR INTERCEPTION OF IMAGE DISPLAY PIPELINE AND INDICATING TO USER

TECHNICAL FIELD

The present disclosure relates generally to processing systems, and more particularly, to one or more techniques for display processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

The commands issued by the processors, such as the display processor, the CPU, or the GPU, may be vulnerable to an attack by a malicious application. If a security of the device is compromised by the malicious application, one or more sensors, applications of the device, and/or user information associated with the device may be accessed without authorization from the device or a user of the device. Accordingly, there is a need for improved security techniques at the device.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may detect that at least one application is activated based on one or more cyclic redundancy check (CRC) values that correspond to the at least one application; generate a user interface (UI) indication for the at least one application based on detecting that the at least one application is activated; and transmit, based on generating the UI indication, at least one UI layer, the at least one UI layer corresponding to the UI indication for the at least one application.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 is a flowchart of an example method of display processing in accordance with one or more techniques of this disclosure.

FIG. 6 is a flowchart of an example method of display processing in accordance with one or more techniques of this disclosure.

DETAILED DESCRIPTION

Figure 1:
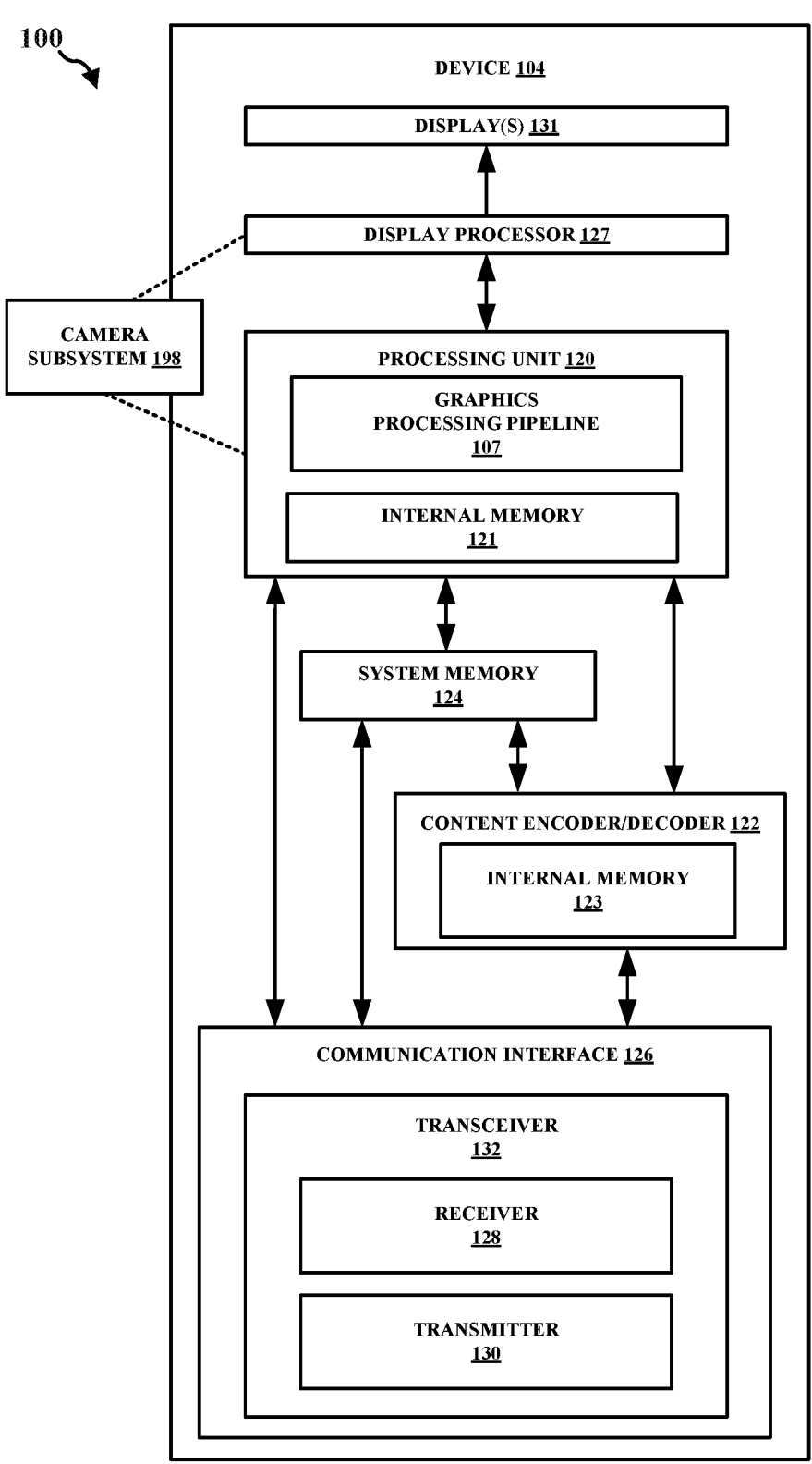
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

When security features of a device are compromised by malicious applications, user information associated with the device, such as travel history, privacy data, personal information, etc., may be determined by the malicious application without authorization from the device and/or the user. In some cases, malicious applications may be configured to launch a camera of the device without displaying an indication to the user that the camera is active. For example, the malicious application may remove/disable certain layers (e.g., a recording icon, preview, etc.) from being displayed on the device, such that the user may not realize instances where the camera is active.

Single core processors that secure some devices may authenticate each buffer received by the processor, regardless of whether the buffer is a secure buffer or a non-secure buffer. While using a single core processor to continuously secure a data path for an entire camera subsystem may increase the security at the device, a negative impact on a performance of the device and/or a user experience may render such techniques impractical. Thus, security enhancements associated with detecting an unauthorized access to the camera/device may have to balance the performance of the device and/or the quality of a user experience with providing the increased security at the device from malicious applications.

Accordingly, the device may monitor for interceptions of an image display pipeline and indicate security breaches to the user via secure indicator pixels displayed on a display panel of the device. The secure indicator pixels may correspond to a user interface (UI) indication (e.g., recording icon), a preview layer, etc., that indicates to the user that the camera is active. Given that the indicator pixels are secure pixels, a non-secure entity, such as malicious applications, may not be configured to remove, cover, or hide the secure pixels/associated layers from being displayed on the display panel. In particular, secure software may compute a cyclic redundancy check (CRC) value for the secure indicator pixels, which may be associated with a secure filing system (SFS). The secure software may further determine region of interest (ROI) CRC configuration registers of a management decision support system (MDSS), and compare the determined ROI CRC configuration registers to the CRC for the secure indicator pixels. If a mismatch is determined between the CRCs, the device may disable the camera and indicate to the user that a security breach has been detected. By selectively protecting registers that are enabled in association with unauthorized access of the camera, as opposed to continuously protecting the entire image display pipeline, the performance and power impact on the device may be more advantageously balanced with device security.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of optional components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to inter-operate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the device 104 may include a camera subsystem 198 that may be connected to, or included within, the display processor 127 or the processing unit 120. The camera subsystem 198 may be configured to detect that at least one application is activated based on one or more CRC values that correspond to the at least one application; generate a UI indication for the at least one application based on detecting that the at least one application is activated; and transmit, based on generating the UI indication, at least one UI layer, the at least one UI layer corresponding to the UI indication for the at least one application. Although the following description may be focused on display processing, the concepts described herein may be applicable to other similar processing techniques.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

Figure 2:
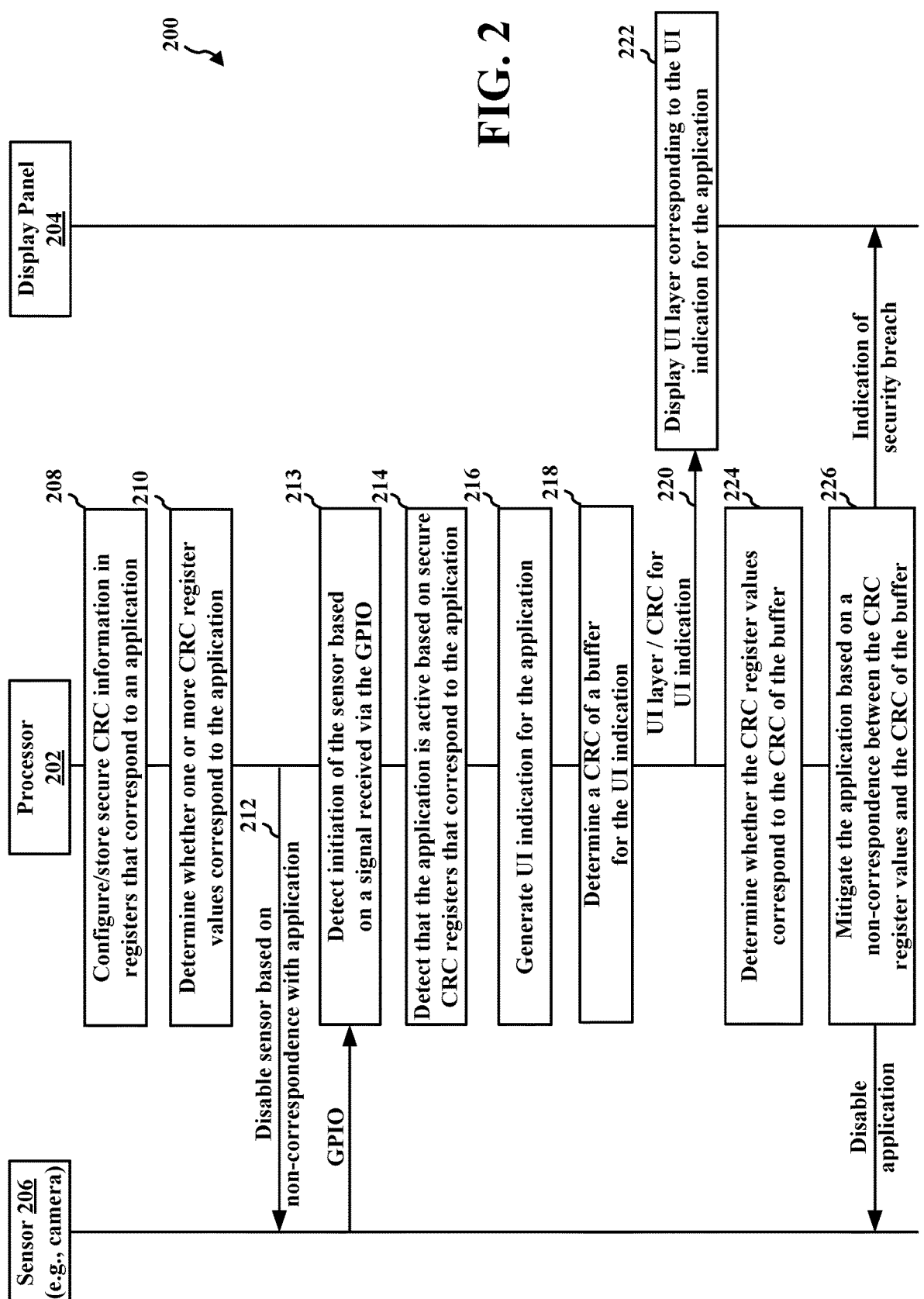
FIG. 2 is a call flow diagram illustrating example communications between a processor, a display panel, and a sensor in accordance with one or more techniques of this disclosure.

FIG. 2 is a call flow diagram 200 illustrating example communications between a processor 202, a display panel 204, and a sensor 206 of a device in accordance with one or more techniques of this disclosure. The processor 202 may be a display processor, a display processing unit (DPU), a CPU, a GPU, an image signal processor (ISP), or other similar processor/processing unit. The sensor 206 may be a camera sensor, a microphone, a global positioning system (GPS), or other similar sensor. At 208, the processor 202 may configure and store secure CRC information (e.g., CRC values, data, code, etc.) in registers that correspond to an application of the device. In some examples, the application may be a camera application for a camera sensor of the device.

At 210, the processor 202 may determine whether one or more CRC values correspond to the application of the device. For example, the processor 202 may compare a CRC value computed for secure indicator pixels associated with a UI indication to a CRC value for an ROI of the application. The CRC value for the secure indicator pixels may correspond to the application when the CRC value matches with the CRC value for the ROI of the application. At 212, the processor 202 may disable the sensor 206 based on an initial non-correspondence between the CRC value for the secure indicator pixels and the application/CRC value for the ROI. For example, the CRC value computed for the secure indicator pixels and stored in a secure filing system (SFS) may not match with the CRC value for the ROI when the application is activated, which may cause the processor 202 to disable the application/sensor 206.

At 213, the processor 202 may detect an initiation of the sensor 206 based on a signal received via a general purpose input/output (GPIO) that provides a communication link with a video front end (VFE) associated with the sensor 206. For example, the processor 202 may receive via the GPIO from the VFE/sensor 206, a signal indicative of sensor initiation (e.g., camera turn on event). The indication of the sensor initiation (e.g., camera turn on event) may be received in secure registers that may be configured for secure software executed by the processor 202. A dedicated GPIO associated with the secure software may prevent initiations of the sensor 206 from being undetected by the processor 202. At 214, the processor 202 may detect that the application is in an activated state based on secure CRC registers that correspond to the application. For example, the secure software of the processor 202 may receive an indication from a high level operating system (HLOS) of the processor 202 indicative of a CRC value of the secure CRC registers, where reception of the indication from the HLOS indicative of the CRC value may indicate that the application associated with the sensor 206 is being maintained in the activated state. At 216, the processor 202 may generate the UI indication for the application. The UI indication may be a camera recording icon, a preview layer, etc., that indicates to the user that the sensor 206 (e.g., camera sensor) is activated.

At 218, the processor 202 may determine a CRC of a buffer for the UI indication, which may be compared to/matched with the secure CRC registers. That is, based on secure rendering, the generated UI indication may be stored in a buffer, such that secure software may determine/compute a CRC value for the buffer for securely displaying the UI indication at the display panel 204. A match between the CRC values may indicate that the camera application is secure, whereas a mismatch between the CRC values may be indicative of a security breach at the device. At 220, the processor 202 may indicate, to the display panel 204, a UI layer for the UI indication, which may be based on the CRC value for the UI indication. At 222, the display panel 204 may securely display the UI layer corresponding to the UI indication for the application on the display panel 204.

After the UI layer corresponding to the UI indication is securely displayed on the display panel 204, the processor 202 may check for security breaches based on determining, at 224, whether the CRC register values correspond to the CRC of the buffer. If the CRC registers do not correspond to the CRC of the buffer, the processor 202 may mitigate, at 226, the application based on the non-correspondence between the CRC register values and the CRC of the buffer. The processor 202 may perform the mitigation of the application based on providing an indication of the security breach to the display panel 204 and/or disabling the application associated with the sensor 206.

Figure 3:
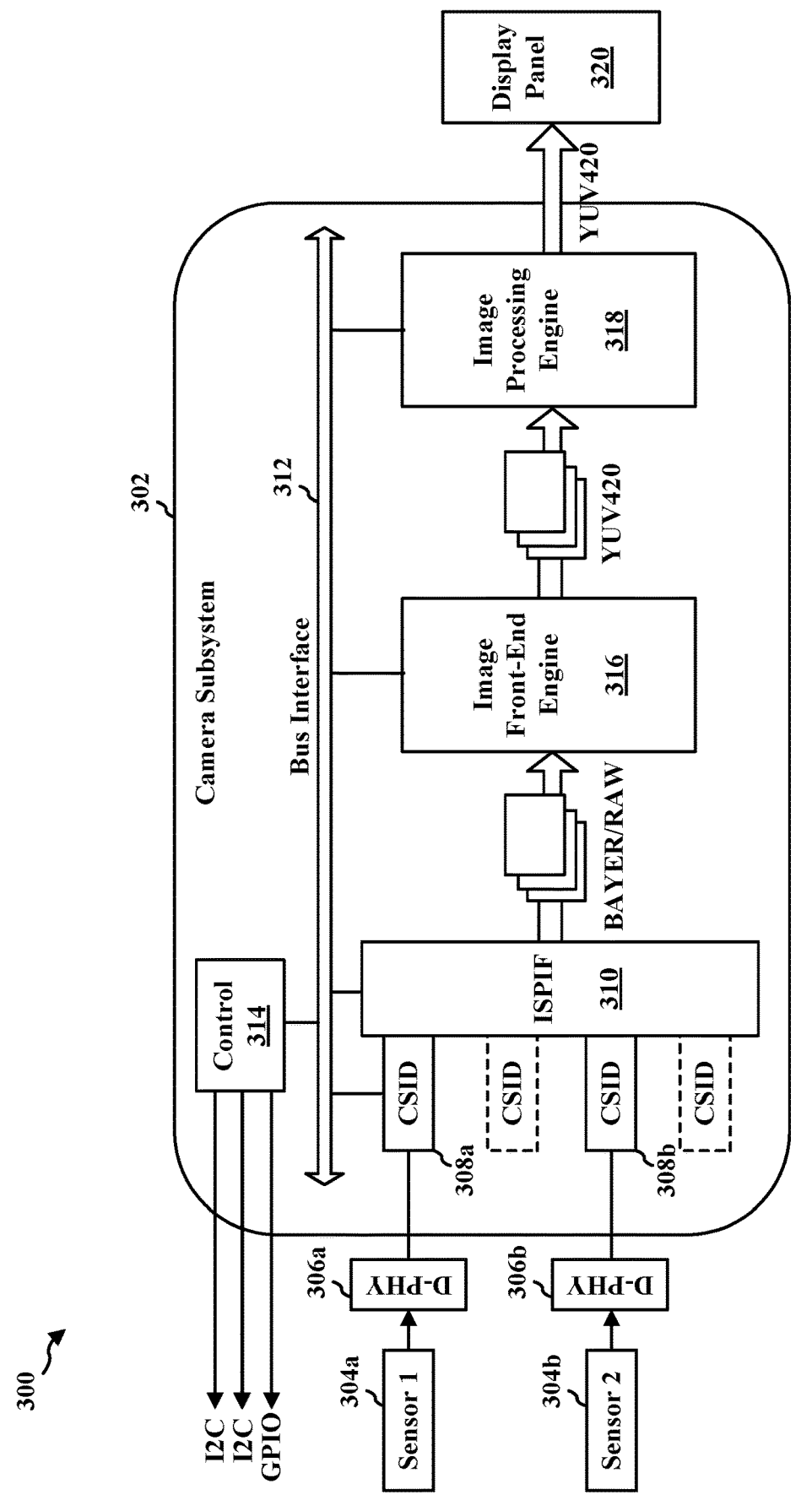
FIG. 3 illustrates a diagram associated with communications of a camera subsystem in accordance with one or more techniques of this disclosure.

FIG. 3 illustrates a diagram 300 associated with communications of a camera subsystem 302 in accordance with one or more techniques of this disclosure. Cyber-attacks on internet-of-things (IoT) devices, such as smart watches and other wearable/mobile devices, may cause user information associated with the IoT devices to be compromised. The compromised user information may be indicative of a travel history of the user, privacy data, personal information, etc. In some cases, a malicious application may be configured to launch the camera subsystem 302 and activate a camera sensor (e.g., first sensor 304a and/or second sensor 304b) on the device without displaying an indication to the user that an associated camera sensor is active. For example, the malicious application may remove/disable certain layers (e.g., a recording icon, preview, etc.) from being displayed on the IoT device.

Some operating systems of devices, e.g., computing devices, may include mechanisms for the user to view the layers (e.g., both secure layers and non-secure layers) to be displayed on a display panel 320 of the device. However, such features may provide a way for malicious applications to determine one or more secure layers to remove from being displayed on the display panel 320. If certain layers are removed, such as a secure preview buffer, recording icon, etc., the user may not realize that the camera sensor of the device is active, as a corresponding layer may not be presented on the display panel 320.

Display hardware may also identify software interface registers that include information about an order, e.g., a Z-order, for composing the layers to be displayed by the display panel 320. If a hacker or malicious application is able to access configuration registers of the display hardware, specific layers may be removed from the Z-order. Determining whether an external application or service has accessed/activated the camera sensor of the device or other similar path and/or accessed the device history or user history may be advantageous for maintaining security at the device.

An indication of an unauthorized access of the device may also be provided to the user via the display panel 320 after the device determines that the unauthorized access of the device has occurred. Implementations of security features associated with detecting an unauthorized access of the device may be configured to maintain a quality of a user experience and/or a performance of the device, while providing protection from malicious applications. That is, continuously securing a data path for an image display pipeline may have an impractical reduction on the performance of the device, such that the performance impact may have to be balanced with security at the device.

A processor used for securing operations of the device may be a single core processor (e.g., used for authenticating secure buffers). A single core processor may authenticate each buffer received by the single core processor, regardless of whether the buffer is a secure buffer or a non-secure buffer. Thus, using a single core processor to secure an entire subsystem, such as the camera subsystem 302, may result in limiting the data path based on the processing capabilities of the single core processor. Hence, single core processing may be an example implementation for which the performance impact on the device may be balanced with security at the device.

In the diagram 300, the camera subsystem 302 may receive one or more signals from a first sensor 304a (e.g., first camera sensor) and/or a second sensor 304b (e.g., second camera sensor) via D-physical (D-PHY) interfaces 306a-306b. The D-PHY interfaces 306a-306b may correspond to a symbol processing rate, or a range of symbol processing rates, where D may be indicative of 500 MHz. The D-PHY interfaces 306a-306b may connect the first/second sensors 304a-304b to the camera subsystem 302 for application processing via called subscriber identifiers (CSIDs) 308a-308b associated with an image signal processor interface (ISPIF) 310. The ISPIF 310 and a plurality of CSIDs including the CSIDs 308a-308b may be connected to a bus interface 312 that provides a communication path between any of the ISPIF 310, the plurality of CSIDs including the CSIDs 308a-308b, an image front-end engine (IFE) 316, an image processing engine (IPE) 318, and/or a control module 314. The control module 314 may communicate with other components external to the camera subsystem 302 via at least one of a GPIO or one or more inter-integrated circuits (I2Cs).

The ISPIF 310 may communicate Bayer/RAW image data to the IFE 316. An unprocessed digital output of the first/second sensors 304a-304b may be referred to as RAW image data. In some aspects, the unprocessed digital outputs of camera sensors may be more specifically referred to as Camera RAW image data, which may provide differentiation from Bayer/RAW image data. Bayer/RAW image data may correspond to monochrome image data that may include undemosaiced data. The IFE 316 may communicate with the IPE 318 based on YUV420. YUV refers to a color encoding system that may be used for at least a portion of a color image pipeline, i.e., Y is the luma channel and UV are the chrominance channels. YUV data may include bitmap image data stored in a YUV format, which may split colors across Y, U, and V values. YUV420 indicates that the U and V channels include half of the resolution of the luma channel (e.g., Y channel) in the horizontal and vertical directions.

The IPE 318 may similarly provide an output from the camera subsystem 302 to the display panel 320 based on YUV420. For example, a record icon may be rendered in a secure buffer and transmitted to the display panel 320 as an indicator that the camera sensor of the device is active. While consideration may be provided for securing the entire image display pipeline, implementing such levels of security for the image display pipeline may impact the performance and/or power consumption of the device. When a camera sensor is activated for use by the device, a camera turn on configuration may be accessed via secure registers. Thus, each time the camera turn on configuration occurs, secure processing may be performed for each registry access. Similar processing may be performed at other locations in the pipeline.

Some registers that may be secured for monitoring interception of the image display pipeline may be used in other cases that are not associated with the camera subsystem 302. For example, a GPU may be used as a general processor in association with the camera subsystem 302 as well as for other applications that are not associated with the camera subsystem 302. If all the registers of the GPU were to be secured to avoid a security breach at the camera subsystem 302, the performance of the device may be decreased based on a single core processor attempting to program an increased number of registers via secure software.

In order to reduce an impact of certain attacks, e.g., phishing attacks, the camera turn on configuration may be based on secure registers. UI icon rendering (e.g., recording icons), previews, etc., for the camera turn on configuration may be provided to the display panel 320 via a secure mode. That is, UI layers associated with camera sensor activation may be securely provided to the display hardware. A recovery mechanism may also be implemented for instances where the device determines that a security breach has occurred at the camera subsystem 302. The device may iteratively analyze data transmitted over a physical display link that enters the image display pipeline (e.g., based on a CRC) and deactivate the camera sensor when a security breach is determined. The device may also indicate the security breach to the user via the connected display panel 320. The display panel 320 may further provide information indicative of the security breach to the camera sensor. For example, the display panel 320 may indicate that a CRC will be determined in association with a region of the display panel 320 that corresponds to a location of the recording icon for storing an expected CRC value. When the camera sensor receives the indication of the security breach, a driver may maintain the camera sensor in a deactivated state.

Figure 4:
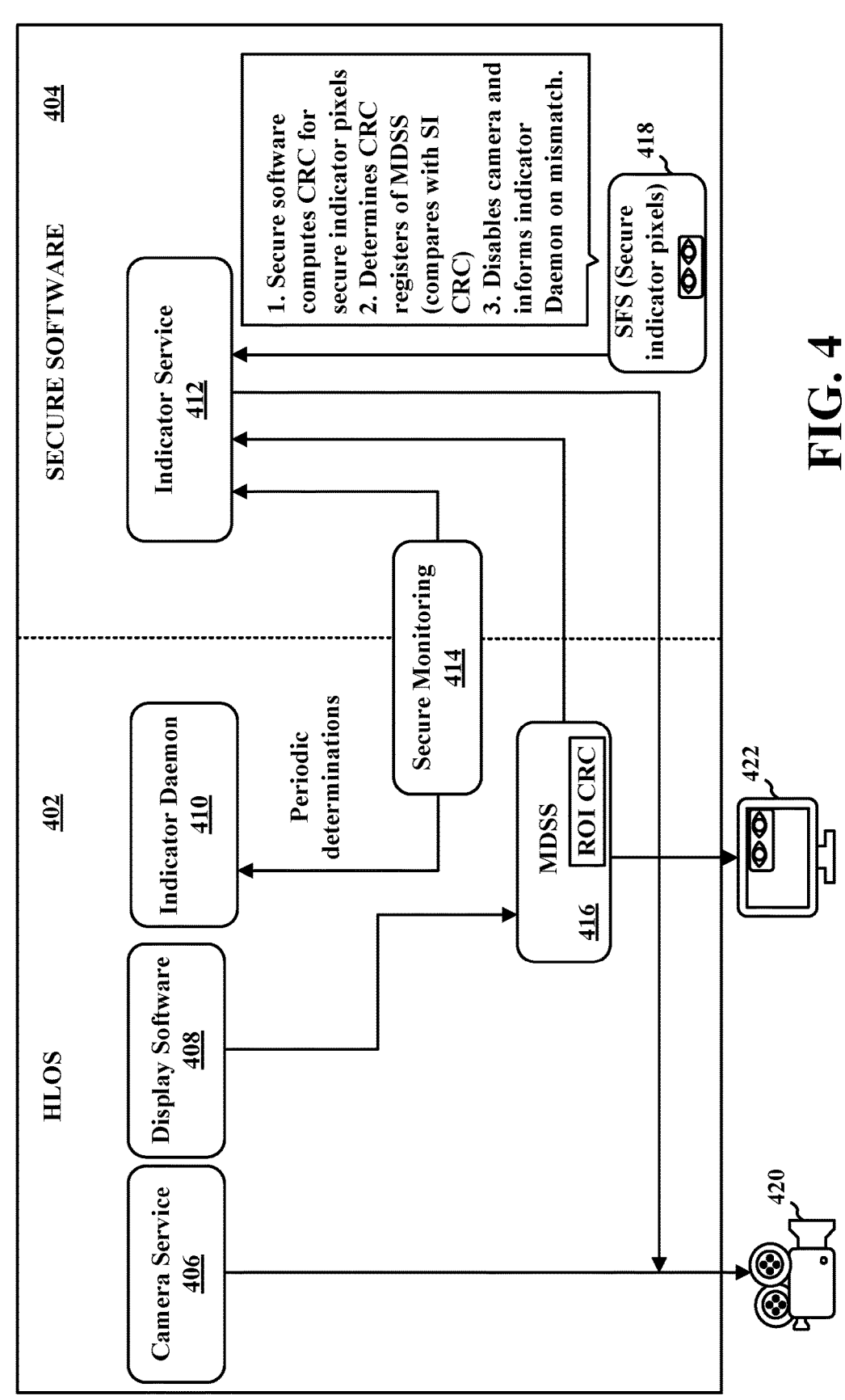
FIG. 4 illustrates an architecture diagram for monitoring interception of an image display pipeline in accordance with one or more techniques of this disclosure.

FIG. 4 illustrates an architecture diagram 400 for monitoring interception of an image display pipeline in accordance with one or more techniques of this disclosure. The secure software 404 may compute the CRC for secure indicator pixels of a SFS 418, determine CRC registers of a MDSS 416, which may be configured for ROI CRC, and compare the determined CRC registers of the MDSS 416 to the CRC for the secure indicator pixels of the SFS 418. If a mismatch is determined based on the comparison of the CRCs, the device may disable the camera hardware 420 and inform the indicator daemon 410 of the disabled camera hardware 420.

Security at the device may be balanced with performance impacts to the device by protecting ROI CRC configuration registers for the display panel 422. After an ROI is determined for a particular region of the display panel 422 (e.g., corresponding to a location of a recording icon), the device may iteratively transmit the CRC for the particular region to the camera hardware 420. In aspects, all of the ROI CRC configuration registers for the display panel 422 may be protected by the secure software 404. As the ROI CRC configuration registers may not be used for non-secure configurations of the display panel 422, usage of the ROI CRC configuration registers may be reserved for cases where the CRC is to be computed by the device. Accordingly, the ROI CRC configuration registers may not increase a latency or reduce performance of the device, given that the ROI CRC configuration registers are not utilized for other operations of the device.

A GPIO associated with a VFE/camera hardware 420 may be determined via the secure software 404 to detect the camera turn on event. Camera configuration registers of the VFE for the camera turn on event may be used to limit an impact of malicious attacks on the camera hardware 420/camera service 406. For instance, the camera turn on event may be protected by secure software 404 that may determine the VFE/camera turn on event is being received, e.g., from an external GPU that is also protected by the secure software 404.

The secure software 404 may be used to perform secure rendering/generation of a camera UI icon, preview, etc. The secure software 404 may compute and store the CRC of a single UI frame buffer associated with the camera UI icon, preview, etc., and provide corresponding information to the display panel 422. The computation of the CRC and the generation of the secure buffer for GPU rendering, which may be initiated by the secure software 404, may be procedures that are not performed for other operations of the device.

The secure UI layer may be provided directly to the display panel 422 (e.g., without the use of any intervening software). The display panel 422 may periodically determine the CRC of the pixel data transmitted via the display link and compare the CRC for the pixel data to the CRC for the secure UI layers. If the CRC values do not match, the device may deactivate the camera hardware 420/camera service 406. The CRC for the pixel data may be determined in association with the configuration registers for comparing the CRC to the separate CRC determined for the secure UI layers.

In the architecture diagram 400, the SFS 418 may be accessed by the secure software 404. An original equipment manufacturer (OEM) may configure, to the SFS 418, the secure indicator pixels to be displayed on the display panel 422 when the camera hardware 420 is active. For example, the secure indicator pixels may correspond to an icon, such as a displayed set of eyes, that indicates to the user that the camera hardware 420 is active. The secure software 404 may determine the secure indicator pixels from a secure memory that stores the secure indicator pixels, where the secure memory may not be accessed by a non-secure entity. The secure indicator pixels may be provided from the SFS 418 to an indicator service 412.

An HLOS 402 may generate a secure layer for the secure software 404 to include the secure indicator pixels. Display software 408 may determine the secure indicator pixels and provide the secure indicator pixels to the MDSS 416, which may include ROI CRC configuration registers programed by the secure software 404. Thus, the ROI CRC configuration registers may be protected, as the ROI CRC configuration registers may be programed by the secure software 404. At a composed output of the data/layers, the display panel 422 may determine the ROI CRC for a particular region (e.g., corresponding to the secure indicator pixels).

The secure software 404 may periodically determine, based on the ROI CRC configuration registers, whether the secure indicator pixels are displayed on the display panel 422, or whether the secure indicator pixels have been removed, overlapped with other layers, etc. For example, pixel data may be compared with the data of the memory/layer to perform secure monitoring 414. The secure software 404 may also determine a status of the camera hardware 420 (e.g., whether the camera is on/off) based on a camera service 406 associated with the camera hardware 420 and indicate a determined security breach to the user.

ROI CRC at the MDSS 416 may enable the indicator service 412 associated with the secure software 404 to disable the camera hardware 420. The indicator service 412 may generate the secure indicator pixels to be displayed on the display panel 422 and, after securely rendering the pixels, program the pixels into the MDSS 416/hardware pipeline for being displayed on the display panel 422. The ROI CRC may be periodically provided to the indicator service 412 for comparing the ROI CRC to the CRC of the secure indicator pixels. If a mismatch is detected, the indicator service 412 may indicate a security breach directly to the camera hardware 420 for deactivating the camera hardware 420.

By selectively protecting registers that are solely enabled in association with malicious attacks on the camera service 406, as opposed to continuously protecting the entire image display pipeline, the performance/power impact on the device may be balanced with device security. That is, ROI-based CRC may be determined by the MDSS 416 at a mixer/interface level, and the CRC for the regions that correspond to the secure indicator pixels may be determined by the secure software 404, to periodically determine/indicate whether the mismatching CRC is associated with a malicious use of the camera hardware 420 and/or the image display pipeline. A frequency of performing the CRC comparison/validation and/or trigger conditions for performing the CRC comparison/validation may be based on OEM protocols.

Additionally, the aspects described herein are not limited to applications associated with the camera. Protections may be enabled for other cores including, but not limited to an IFE/IPE, video processing unit (VPU), DPU, GPU, network processing unit (NPU), core digital signal processing (cDSP), advanced digital signal processing (ADSP), etc., and/or to provide protection for other use cases. Such protections may provide functional security at the device, rather than subsystem-specific security. Protections for multimedia cores may be performed by the secure software 404 based on techniques that balance performance/power impacts on the device with user experience/device security.

FIG. 5 is a flowchart 500 of an example method of display processing in accordance with one or more techniques of this disclosure. The method may be performed by an apparatus, such as an apparatus for display processing, a DPU or other processor/processing unit, an apparatus that includes a camera subsystem, a wireless communication device, and the like, as used in connection with the aspects of FIGS. 1-4.

At 502, the apparatus may detect that at least one application is activated based on one or more CRC values that correspond to the at least one application. For example, referring to FIGS. 2-3, the processor 202 may detect, at 214, that the application is active based on the secure CRC registers corresponding to the application. In aspects, the processor 202 may detect an active signal from the sensor 206. In the diagram 300, the camera subsystem 302 may receive one or more signals from the first/second sensors 304a-304b indicative of a camera application being active. Further, step 610 may be performed by the camera subsystem 198. In aspects, the at least one application may include at least one camera application.

At 504, the apparatus may generate a UI indication for the at least one application based on detecting that the at least one application is activated. For example, referring to FIG. 2, the processor 202 may generate, at 216, a UI indication for the application based on detecting, at 214, that the application is active. Further, step 612 may be performed by the camera subsystem 198.

At 506, the apparatus may transmit, based on generating the UI indication, at least one UI layer—the at least one UI layer corresponds to the UI indication for the at least one application. For example, referring to FIG. 2, the processor 202 may transmit, at 220, a UI layer for the UI indication to the display panel 204. Further, step 616 may be performed by the camera subsystem 198.

FIG. 6 is a flowchart 600 of an example method of display processing in accordance with one or more techniques of this disclosure. The method may be performed by an apparatus, such as an apparatus for display processing, a DPU or other processor/processing unit, an apparatus that includes a camera subsystem, a wireless communication device, and the like, as used in connection with the aspects of FIGS. 1-4.

At 602, the apparatus may configure, in a secure mode or a protected mode, one or more CRC registers that store one or more CRC values. For example, referring to FIG. 2, the processor 202 may configure, at 208, secure CRC registers that include CRC information and correspond to an application (e.g., associated with a camera sensor). Further, step 602 may be performed by the camera subsystem 198.

At 604, the apparatus may store the one or more CRC values in a secure memory or a secure buffer after configuring the one or more CRC registers in the secure mode or the protected mode. For example, referring to FIG. 2, the processor 202 may store, at 208, the configured/secure CRC registers that include the CRC information and correspond to the application. Further, step 604 may be performed by the camera sub system 198.

At 606, the apparatus may determine whether the one or more CRC values correspond to at least one application on a device. For example, referring to FIGS. 2 and 4, the processor 202 may determine, at 210, that one or more CRC registers correspond to the application. Additionally, the secure software 404 may compute the CRC for the secure indicator pixels of the SFS 418. Further, step 606 may be performed by the camera subsystem 198. The one or more CRC registers may correspond to the at least one application when the one or more CRC registers match with the at least one application. The one or more CRC values may be associated with an ROI at the device.

At 608, the apparatus may disable the at least one application when the one or more CRC values do not correspond to the at least one application. For example, referring to FIG. 2, the processor 202 may disable, at 212, the sensor 206 based on a non-correspondence between the one or more CRC registers and the camera application. Further, step 608 may be performed by the camera subsystem 198. In aspects, the at least one application may be automatically disabled or disabled by a user of the device.

At 610, the apparatus may detect that the at least one application is activated based on the one or more CRC values that correspond to the at least one application. For example, referring to FIGS. 2-3, the processor 202 may detect, at 214, that the application is active based on the secure CRC registers corresponding to the application. In aspects, the processor 202 may detect an active signal from the sensor 206. In the diagram 300, the camera subsystem 302 may receive one or more signals from the first/second sensors 304a-304b indicative of a camera application being active. Further, step 610 may be performed by the camera subsystem 198. In aspects, the at least one application may include at least one camera application.

At 612, the apparatus may generate a UI indication for the at least one application based on detecting that the at least one application is activated. For example, referring to FIG. 2, the processor 202 may generate, at 216, a UI indication for the application based on detecting, at 214, that the application is active. Further, step 612 may be performed by the camera subsystem 198. The UI indication may be generated, at 216, via a secure mode or secure rendering.

At 614, the apparatus may determine and transmit a CRC of a buffer for the UI indication for the at least one application. For example, referring to FIG. 2, the processor 202 may determine, at 218, a CRC of a buffer for the UI indication. The processor 202 may transmit, at 220, CRC for the UI indication to the display panel 204. In some examples, the at least one UI layer may be displayed (e.g., at 222) directly after the generation of the UI indication. Further, step 614 may be performed by the camera subsystem 198.

At 616, the apparatus may transmit, based on generating the UI indication, at least one UI layer—the at least one UI layer corresponds to the UI indication for the at least one application. For example, referring to FIG. 2, the processor 202 may transmit, at 220, a UI layer for the UI indication to the display panel 204. Further, step 616 may be performed by the camera subsystem 198.

At 618, the apparatus may determine, based on transmitting the at least one UI layer, whether the one or more CRC values correspond to a CRC buffer. For example, referring to FIG. 2, the processor 202 may determine, at 224, whether the CRC registers correspond to the CRC of the buffer. The one or more CRC registers may correspond to the CRC of the buffer when the one or more CRC registers match with the at least one application. The one or more CRC registers may be associated with an ROI at the device. Further, step 618 may be performed by the camera subsystem 198.

At 620, the apparatus may mitigate the at least one application when the one or more CRC values do not correspond to the CRC of the buffer. For example, referring to FIG. 2, the processor 202 may mitigate, at 226, the application based on a non-correspondence between the CRC registers and the CRC of the buffer. The mitigation, at 226, may include at least one of disabling the application in association with the sensor 206 or indicating a security breach to the display panel 204. Further, step 620 may be performed by the camera subsystem 198.

In configurations, a method or an apparatus for display processing is provided. The apparatus may be a DPU, a camera system, a display processor, or some other processor/processing unit that may perform display processing. In aspects, the apparatus may be the display processor 127, the processing unit 120, an apparatus that includes the camera subsystem 198, etc., which may be included within the device 104, or may be some other hardware within the device 104 or another device. The apparatus may include means for detecting that at least one application is activated based on one or more CRC values that correspond to the at least one application; means for generating a UT indication for the at least one application based on detecting that the at least one application is activated; and means for transmitting, based on generating the UT indication, at least one UT layer, the at least one UT layer corresponding to the UT indication for the at least one application. The apparatus may include means for configuring, in a secure mode or a protected mode, one or more CRC registers that store the one or more CRC values. The apparatus may include means for storing the one or more CRC values in a secure memory or a secure buffer after configuring the one or more CRC registers in the secure mode or the protected mode. The apparatus further includes means for determining whether the one or more CRC values correspond to the at least one application, where the one or more CRC values correspond to the at least one application when the one or more CRC values match with the at least one application. The apparatus may include means for disabling the at least one application when the one or more CRC values do not correspond to the at least one application. The apparatus may include means for determining a CRC of a buffer for the UI indication for the at least one application. The apparatus may include means for transmitting, to a display at the device, the determined CRC of the buffer for the UI indication. The apparatus may include means for disabling the at least one application based on the UI indication for the at least one application. The apparatus may include means for determining, based on transmitting the at least one UI layer, whether the one or more CRC values correspond to a CRC of a buffer; and means for mitigating the at least one application when the CRC values do not correspond to the CRC of the buffer, the mitigation of the at least one application including at least one of transmitting a security indication to a display at the device or disabling the at least one application.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may comprise RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of display processing at a device, including: detecting that at least one application is activated based on one or more CRC values that correspond to the at least one application; generating a UI indication for the at least one application based on detecting that the at least one application is activated; and transmitting, based on generating the UI indication, at least one UI layer, the at least one UI layer corresponding to the UI indication for the at least one application.

Aspect 2 may be combined with aspect 1 and further includes configuring, in a secure mode or a protected mode, one or more CRC registers that store the one or more CRC values.

Aspect 3 may be combined with any of aspects 1-2 and further includes storing the one or more CRC values in a secure memory or a secure buffer after configuring the one or more CRC registers in the secure mode or the protected mode.

Aspect 4 may be combined with any of aspects 1-3 and further includes determining whether the one or more CRC values correspond to the at least one application, where the one or more CRC values correspond to the at least one application when the one or more CRC values match with the at least one application.

Aspect 5 may be combined with any of aspects 1-4 and includes that the one or more CRC values are associated with an ROI at the device.

Aspect 6 may be combined with any of aspects 1-5 and further includes disabling the at least one application when the one or more CRC values do not correspond to the at least one application.

Aspect 7 may be combined with any of aspects 1-6 and includes that the at least one application includes at least one camera application.

Aspect 8 may be combined with any of aspects 1-7 and includes that the UT indication is generated via a secure mode or secure rendering.

Aspect 9 may be combined with any of aspects 1-8 and further includes determining a CRC of a buffer for the UT indication for the at least one application.

Aspect 10 may be combined with any of aspects 1-9 and further includes transmitting, to a display at the device, the determined CRC of the buffer for the UT indication.

Aspect 11 may be combined with any of aspects 1-10 and includes that the at least one UT layer is displayed directly after the generation of the UT indication.

Aspect 12 may be combined with any of aspects 1-11 and further includes disabling the at least one application based on the UT indication for the at least one application.

Aspect 13 may be combined with any of aspects 1-12 and includes that the at least one application is automatically disabled or disabled by a user of the device.

Aspect 14 may be combined with any of aspects 1-13 and further includes determining, based on transmitting the at least one UT layer, whether the one or more CRC values correspond to a CRC of a buffer; and mitigating the at least one application when the CRC values do not correspond to the CRC of the buffer, the mitigation of the at least one application including at least one of transmitting a security indication to a display at the device or disabling the at least one application.

Aspect 15 is an apparatus for display processing including at least one processor coupled to a memory and configured to implement a method as in any of aspects 1-14.

Aspect 16 may be combined with aspect 15 and includes that the apparatus is a wireless communication device.

Aspect 17 is an apparatus for display processing including means for implementing a method as in any of aspects 1-14.

Aspect 18 is a computer-readable medium storing computer executable code, the code when executed by at least one processor causes the at least one processor to implement a method as in any of aspects 1-14.

Various aspects have been described herein. These and other aspects are within the scope of the following claims.

What is claimed is:

1. An apparatus for display processing at a device, comprising:
  memory; and
  at least one processor coupled to the memory and configured to:
    configure, in a secure mode or a protected mode, one or more CRC registers for storing a first set of CRC values that correspond to at least one application;
    store the first set of CRC values in the configured one or more CRC registers;
    receive an indication that the at least one application is in an activated state as executed by a processor of an operating system (OS), wherein the indication is associated with a first set of cyclic redundancy check (CRC) values that correspond to the at least one application;

generate, after storage of the first set of CRC values in the configured one or more CRC registers, a user interface (UI) indication for the at least one application based on the received indication that the at least one application is in the activated state;

transmit, based on the generated UI indication, at least one UI layer corresponding to the generated UI indication for the at least one application; and detect a security breach of the at least one application based on a mismatch between a second set of CRC values determined based on the transmitted at least one UI layer and the configured one or more CRC registers that store the first set of CRC values in the secure mode or the protected mode.

2. The apparatus of claim 1, wherein the at least one processor is further configured to:

transmit, based on the detected security breach, an indication of the detected security breach.

3. The apparatus of claim 1, wherein the second set of CRC values are associated with a region of interest (ROI) at the device.

4. The apparatus of claim 1, wherein the at least one processor is further configured to:

disable the at least one application based on the detected security breach; and maintain the at least one application in a deactivated state.

5. The apparatus of claim 1, wherein the indication that the at least one application is in the activated state indicates that at least one camera application is in the activated state, wherein, to receive the indication that the at least one application is in the activated state as executed by the processor of the OS, the at least one processor is configured to:

receive a signal indicative of a camera sensor initiation.

6. The apparatus of claim 1, wherein to generate the UI indication, the at least one processor is configured to:

generate the UI indication via the secure mode or secure rendering.

7. The apparatus of claim 1, wherein, to detect the security breach of the at least one application based on the mismatch between the second set of CRC values determined based on the transmitted at least one UI layer and the first set of CRC values that correspond to the at least one application, the at least one processor is configured to:

determine the second set of CRC values based on a UI frame buffer associated with a display at the device.

8. The apparatus of claim 7, wherein, to transmit the at least one UI layer, the at least one processor is configured to:

transmit, to the UI frame buffer associated with the display at the device, the at least one UI layer.

9. The apparatus of claim 1, wherein the at least one processor is further configured to:

display the at least one UI layer after the generation of the UI indication, wherein the UI indication comprises an icon or a preview layer.

10. The apparatus of claim 2, wherein the at least one processor is further configured to:

disable the at least one application based on the transmitted indication of the detected security breach.

11. The apparatus of claim 10, wherein to disable the at least one application, the at least one processor is configured to:

automatically disable the at least one application to a deactivated state; or disable the at least one application to the deactivated state via a user of the device.

12. The apparatus of claim 1, wherein the at least one processor is further configured to:

periodically determine the second set of CRC values based on the transmitted at least one UI layer.

13. The apparatus of claim 1, wherein the apparatus comprises a wireless communication device.

14. A method of display processing at a device, comprising:

configuring, in a secure mode or a protected mode, one or more CRC registers for storing a first set of CRC values that correspond to at least one application;

storing the first set of CRC values in the configured one or more CRC registers;

receiving an indication that the at least one application is in an activated state as executed by a processor of an operating system (OS), wherein the indication is associated with a first set of cyclic redundancy check (CRC) values that correspond to the at least one application;

generating, after storage of the first set of CRC values in the configured one or more CRC registers, a user interface (UI) indication for the at least one application based on the received indication that the at least one application is in the activated state;

transmitting, based on the generated UI indication, at least one UI layer corresponding to the generated UI indication for the at least one application; and detecting a security breach of the at least one application based on a mismatch between a second set of CRC values determined based on the transmitted at least one UI layer and the configured one or more CRC registers that store the first set of CRC values in the secure mode or the protected mode.

15. The method of claim 14, further comprising:

transmitting, based on the detected security breach, an indication of the detected security breach.

16. The method of claim 14, wherein the second set of CRC values are associated with a region of interest (ROI) at the device.

17. The method of claim 14, further comprising:

disabling the at least one application based on the detected security breach; and maintaining the at least one application in a deactivated state.

18. The method of claim 14, wherein the indication that the at least one application is in the activated state indicates that at least one camera application is in the activated state, wherein receiving the indication that the at least one application is in the activated state as executed by the processor of the OS comprises:

receiving a signal indicative of a camera sensor initiation.

19. The method of claim 14, further comprising:

generating the UI indication via secure mode or secure rendering.

20. The method of claim 14, wherein detecting the security breach of the at least one application based on the mismatch between the second set of CRC values determined based on the transmitted at least one UI layer and the first set of CRC values that correspond to the at least one application comprises:

determining the second set of CRC values based on a UI frame buffer associated with a display at the device.

21. The method of claim 20, wherein transmitting the at least one UI layer comprises:

transmitting, to the UI frame buffer associated with the display at the device, the at least one UI layer.

22. The method of claim 14, further comprising:

displaying the at least one UI layer after the generation of the UI indication, wherein the UI indication comprises an icon or a preview layer.

23. The method of claim 14, further comprising:

disabling the at least one application based on the transmitted indication of the detected security breach.

24. The method of claim 23, further comprising:

automatically disabling the at least one application to a deactivated state; or disabling the at least one application to the deactivated state via a user of the device.

25. The method of claim 14, further comprising:

periodically determining the second set of CRC values based on the transmitted at least one UI layer.

26. A non-transitory computer-readable medium storing computer executable code, the code when executed by at least one processor, causes the at least one processor to:

configure, in a secure mode or a protected mode, one or more CRC registers for storing a first set of CRC values that correspond to at least one application;

store the first set of CRC values in the configured one or more CRC registers;

receive an indication that the at least one application is in an activated state as executed by a processor of an operating system (OS), wherein the indication is associated with a first set of cyclic redundancy check (CRC) values that correspond to the at least one application;

generate, after storage of the first set of CRC values in the configured one or more CRC registers, a user interface (UI) indication for the at least one application based on the received indication that the at least one application is in the activated state;

transmit, based on the generated UI indication, at least one UI layer corresponding to the generated UI indication for the at least one application; and detect a security breach of the at least one application based on a mismatch between a second set of CRC values determined based on the transmitted at least one UI layer and the configured one or more CRC registers that store the first set of CRC values in the secure mode or the protected mode.

\* \* \* \* \*